Aug. 18, 1931. H. H. JOHNSTON 1,819,177
CONTROL APPARATUS
Filed Feb. 19, 1927
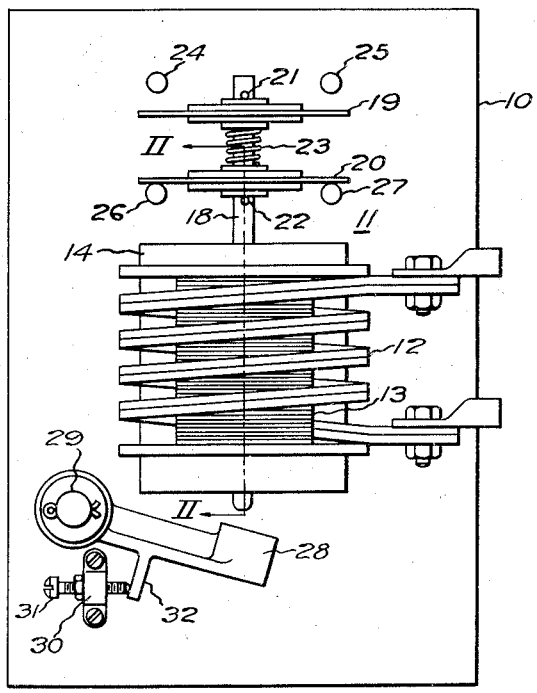
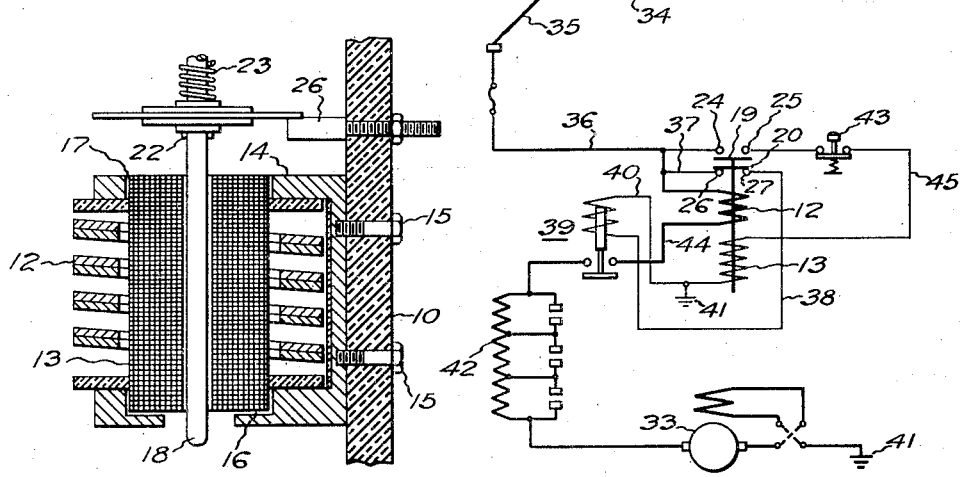
WITNESSES:
G. S. Neilson
E. W. Savage
INVENTOR
Howard H. Johnston
BY
Wesley G. Carr
ATTORNEY Patented Aug. 18, 1931

1,819,177

UNITED STATES PATENT OFFICE

HOWARD H. JOHNSTON, OF SWISSVALE, PENNSYLVANIA, ASSIGNOR TO WESTINGHOUSE ELECTRIC & MANUFACTURING COMPANY, A CORPORATION OF PENNSYLVANIA

CONTROL APPARATUS

Application filed February 19, 1927. Serial No. 169,570.

This invention relates generally to control apparatus and more particularly to the structural features of control apparatus employing electromagnets.

An object of the invention, generally stated, is the provision of control apparatus that shall be simple and efficient in operation and readily and economically manufactured.

A more specific object of the invention is the provision of an electromagnet that may be utilized as the core of another electromagnet.

Other objects of the invention will, in part, be obvious, and will, in part, appear hereinafter.

The invention accordingly is disclosed in the embodiment thereof shown in the accompanying drawings, and comprises the structural features and combinations of elements and arrangement of parts that will be exemplified in the structure hereinafter set forth, and the scope of the application of which will be indicated in the claims.

For a fuller understanding of the nature and objects of the invention, reference should be had to the following detailed description, taken in conjunction with the accompanying drawings, in which;

Figure 1 is a view, in front elevation, of a relay constructed in accordance with this invention;

Fig. 2 is a view, in vertical section, along the line II—II of Fig. 1; and,

Fig. 3 is a diagram of a simple circuit in which the control apparatus may be connected to control the operation of a motor.

Referring now to the drawings, 10 designates a panel on which the control apparatus or relay, shown generally at 11, may be mounted. As is the usual practice, the panel is made from some non-conductive material, such for example, as marble.

The relay comprises a main coil 12 which is adapted to carry heavy currents and an auxiliary coil 13 which is disposed centrally in the main coil. In order to support the coils 12 and 13 on the panel 10, a bracket 14 of substantially U-shape is provided. As shown, the bracket 14 is mounted on the panel by means of screw bolts 15 which extend through the panel and engage in threaded openings provided in the back of the bracket.

As will be observed, the main coil 12 is set between the arms of the bracket 14, while the auxiliary coil 13 is mounted in a counter-sunk opening 16 provided in the lower arm of the bracket and extends through an opening 17 in the upper arm of the bracket. The bracket is preferably made from some magnetic material and is lined with some insulating material, thereby ensuring the proper insulation of the relay coils.

A plunger 18 is slidably mounted in the auxiliary coil 13, and two contact plates 19 and 20 are disposed on its upper end. As shown, the contact plates are mounted between pins 21 and 22, which extend through the plunger 18, and they are retained in spaced relation by a spring 23. The upper contact plate is disposed to engage contact members 24 and 25 mounted on the panel 10, while the lower plate 20 is located in alinement with the contact members 26 and 27 which are also carried by the panel.

As will be readily understood, the contact plate 20 is normally maintained in engagement with the contact members 26 and 27 by reason of the weight of the contact plates and plunger. The spacing of the contact plates 19 and 20 is such that, when one is in engagement with its contact members, the other is separated from its contact members. Assuming, for example, that the plate 20 is in engagement with the contact members 26 and 27, the plate 19 is spaced from the contact members 24 and 25.

In order to actuate the switch, which comprises the plates 19 and 20 and their respective contact members, a pivotally mounted armature 28 is provided. As illustrated, the armature is pivotally disposed on the pin 29 which is mounted in a threaded opening provided in the panel 10.

As is the usual practice, means is provided for limiting the angular movement of the armature 28 about the pin 29. In this particular construction, a bracket 30, in which a set screw 31 is adjustably mounted, is provided to serve as a stop for the depending arm 32 of the armature 28.

The head of the armature is disposed in alinement with the plunger 18, so that, when the armature is rotated counter-clockwise about the pin 29, it will project the plunger upward. The stop serves to maintain the armature in a predetermined position relative to the coils 12 and 13 when the latter are deenergized.

In order to increase the efficiency of the coil 12, the auxiliary coil 13 is constructed to be utilized as a core. As shown, the auxiliary coil 13 is shaped to simulate a hollow cylinder and comprises a large number of turns of some insulated conductor which is capable of being magnetized. Many such conductors are available, an enameled soft iron wire being suitable for the construction of the auxiliary coil 13.

It will be readily understood that, when an auxiliary coil of this type is utilized, upon the energization of the main coil 12, the auxiliary coil will serve as a path for the lines of magnetic force and thus will perform the functions of a core. Further, the bracket 14 provides a path for the lines of magnetic force flowing in coil 13, thereby completing the magnetic circuit. However, the relay will function satisfactorily independently of a return magnetic circuit, such as is presented by the bracket 14. By thus concentrating the lines of magnetic force, the efficiency of the coil 12 is increased.

Further, it will be clear that, since the turns of the auxiliary coil 12 are insulated from one another by a layer of insulating material, it may be energized to function as an electromagnet. In view of the large number of turns in the auxiliary coil, it may be sufficiently energized to perform its functions by a small current, as compared with the current required for the energization of the main coil 12.

In order that the operation of the relay may be clearly understood, a description of the manner in which it functions when connected in a simple circuit, such as shown in Fig. 3, will now be given.

Assuming that the relay is utilized for controlling the supply of current to a motor 33 provided for propelling some vehicle, the main coil 12 will be connected in series with the motor, while the auxiliary coil 13 will be connected across the motor or between the power source which, in this particular case, is the trolley conductor 34 and ground.

When the contact plate 20 is in engagement with the contact members 26 and 27, current flows from the trolley conductor, through the trolley pole 35, conductors 36 and 37, contact members 26 and 27, bridged by the contact plate 20, conductor 38, the actuating coil of the switch 39 and conductor 40, to ground at 41. The switch 39 is closed to establish the motor circuit which extends from the trolley pole 35, through conductor 36, the main coil 12 of the relay, conductor 44, switch 39, resistance units 42 and the motor 33, to ground at 41.

It will be readily understood that, when current flows in the coil 12, lines of magnetic forces are induced in the auxiliary coil 13 which now functions as a core for the main coil 12. If an excessive current flows in the motor circuit, the main coil 12 will be sufficiently energized to effect the actuation of the armature 28. When the armature 28 is rotated counter-clockwise about the pin 29, it projects the plunger 18 upward to interrupt the actuating circuit of the switch 39, which has been traced hereinbefore. Immediately after interrupting the circuit through the plate 20, the plate 19 is projected into engagement with the conducting members 24 and 25, thus establishing an energizing circuit for the auxiliary coil 13.

As will be observed, the energizing circuit for the auxiliary coil 13 extends from the energized conductor 36, through the contact members 24 and 25, bridged by the contact plate 19, the push button switch 43, conductor 45 and auxiliary coil 13, to ground at 41. The auxiliary coil immediately functions as an electromagnet and serves to retain the armature 28 in its raised position. In such manner, a holding circuit for the armature 28 is established.

When it is desired to interrupt the energizing circuit of the coil 13 to permit the re-establishment of the motor circuit, the push button 43 already referred to is actuated. Upon the operation of the push-button switch, the energizing circuit of the coil 13 is interrupted, and the armature 28 is allowed to drop back to its normal position where the arm 32 engages the set screw 31. The contact plate 20 drops into engagement with the contact members 26 and 27 to re-establish the actuating circuit of the switch 39.

The above description sets forth a relay in which the auxiliary coil is adapted to function as a core for the main coil and also as in independent electromagnet. Such construction reduces the expense of manufacture and still ensures efficiency in operation.

Since certain changes may be made in the above construction and different embodiments of the invention may be made without departing from the spirit thereof, it is intended that all matter contained in the above description, or shown in the accompanying drawing shall be interpreted as illustrative and not in a limiting sense.

I claim as my invention:

1. In control apparatus, in combination, a movable armature, a main coil for actuating the armature, an auxiliary coil comprising turns of a conductor of magnetic material disposed to function as a core for the main coil and to co-operate in the operation of the armature.

2. In control apparatus, in combination, a main coil, an auxiliary coil comprising turns of an insulated conductor of magnetizable metal, the auxiliary coil being disposed within the turns of the main coil to function as a core when the main coil is energized, and an armature disposed for operation by the co-operative action of the coils.

3. In control apparatus, in combination, a main coil, an auxiliary coil disposed in the main coil, said auxiliary coil comprising turns of insulated iron wire, thereby adapting the auxiliary coil to function as a core for the main coil, and a bracket for supporting the coils, said bracket being associated with the auxiliary coil to form a complete magnetic circuit.

In testimony whereof, I have hereunto subscribed my name this 16th day of February 1927.

HOWARD H. JOHNSTON.